United States Patent [19]

Scherowsky et al.

[11] Patent Number: 5,637,254

[45] Date of Patent: Jun. 10, 1997

[54] FERROELECTRIC LIQUID-CRYSTALLINE POLYMERS, A PROCESS FOR THEIR PREPARATION AND THEIR USE IN ELECTROOPTICAL COMPONENTS

[75] Inventors: Günter Scherowsky; Andreas Schliwa; Wolfgang Trapp, all of Berlin, Germany

[73] Assignee: Hoechst Aktiengesellschaft, Frankfurt, Germany

[21] Appl. No.: 412,617

[22] Filed: Mar. 29, 1995

Related U.S. Application Data

[63] Continuation of Ser. No. 288,581, Aug. 10, 1994, abandoned, which is a continuation of Ser. No. 60,491, May 11, 1993, abandoned, which is a continuation of Ser. No. 635,181, Jan. 3, 1991, abandoned.

Foreign Application Priority Data

Jul. 8, 1988 [DE] Germany .......................... 38 23 154.9

[51] Int. Cl.⁶ .......................... C09K 19/52; C09K 19/34; C09K 19/30; C09K 19/00
[52] U.S. Cl. .......................... 252/299.01; 252/299.61; 252/299.63; 428/1
[58] Field of Search .......................... 252/299.01, 299.61, 252/299.63; 428/1

[56] References Cited

U.S. PATENT DOCUMENTS

| | | | |
|---|---|---|---|
| 4,818,807 | 4/1989 | Morita et al. | 528/191 |
| 4,904,065 | 2/1990 | Yuasa et al. | 359/103 |
| 4,988,459 | 1/1991 | Scherowsky et al. | 252/299.61 |
| 5,336,436 | 8/1994 | Scherowsky et al. | 252/299.61 |

*Primary Examiner*—Cynthia Harris-Kelly
*Attorney, Agent, or Firm*—Curtis, Morris & Safford P.C.

[57] ABSTRACT

A ferroelectric, liquid-crystalline polymer is composed of repeating units of the formula (I)

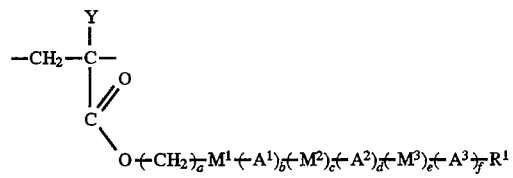

in which
Y=H, $CH_3$ or F,
$R^1$=a radical having at least two chiral centers such as for example

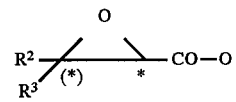

a=2 to 20, preferably 6 to 12,
b,c,d,e and f=0 or 1 with the proviso that d+e+f=2 or 3,
$A^1, A^2$ and $A^3$=for example, 1,4-phenylene, cyclohexylene or 2,5-pyrimidinediyl,
$M^2$ and $M^3$=CO—O, O—CO, CO—S, S—CO, $CH_2$—O, O—$CH_2$, and

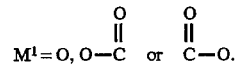

These liquid-crystalline polymers have short response times and resistance to mechanical stresses.

They can be prepared by free-radical polymerization.

6 Claims, No Drawings

FERROELECTRIC LIQUID-CRYSTALLINE POLYMERS, A PROCESS FOR THEIR PREPARATION AND THEIR USE IN ELECTROOPTICAL COMPONENTS

This application is a continuation of application Ser. No. 08/288,581 now abandoned, filed Aug. 10, 1994, which is a continuation of application Ser. No. 08/060,491 filed on May 11, 1993 abandoned, which in turn is a continuation of application Ser. No. 07/635,181 filed on Jan. 3, 1991, abandoned.

BACKGROUND OF THE INVENTION

Liquid crystals have recently come into use in a variety of technical fields in which there is a requirement for certain electrooptical properties (for example low triggering voltages) combined with certain requirements concerning display or switching devices (for example flat construction, low weight). These devices currently utilize dielectric alignment effects in nematic, cholesteric and/or smectic liquid-crystal phases, the light, transparency or reflectivity of the device being dependent on the electrical voltage applied.

A liquid-crystal display consists of two supporting plates, preferably glass plates, which are coated with transparent electrodes and, as a rule, with one or two alignment layers between which the liquid-crystal layer is located. Other components such as polarizers, color filters, passivating layers, anti-reflection layers, diffusion barrier layers and the like are in common use.

Although currently nematic or cholesteric liquid-crystal phases are still predominantly used, for some years ferroelectric, in particular smectic C*, liquid-crystal phases have been gaining in importance.

Ferroelectric liquid crystals have the advantage of very short response times and allow high-resolution screens to be operated without the assistance of electronic elements, such as for example thin-layer transistors, which are necessary when using nematic or cholesteric liquid-crystal phases.

In all the above applications, the liquid crystals are low-molecular-weight liquid-crystalline compounds, i.e. having molecular weights of below 2000 g/mol, preferably below 800 g/mol, and in particular they are not polymers, copolymers, polycondensates or copolycondensates. Owing to their low viscosity, low-molecular-weight liquid crystals generally have the advantage of short response times; this is particularly true of ferroelectric liquid crystals, whose response times are in the range of μs and which therefore respond 10 to 1000 times faster than conventional nematic liquid-crystal phases.

However, on using ferroelectric liquid crystals, the problem of high susceptibility of the alignment to mechanical stress (shock, impact, pressure, heat distortion, bending and so on) can occur, which can lead to irreversible disruption of the image quality of a display. Currently, this high susceptibility impedes the construction of flexible ferroelectric LC displays and increases the cost of production of conventional displays, i.e. those with glass or rigid plastic plates.

It is advantageous to use polymeric liquid crystals owing to their lower deformability and better processibility.

Although polymeric liquid crystals have already been described on several occasions (for example J. Polym. Sci. Polym. Lett. Ed. 13, 243 (1975); Polym. Bull. 6, 309 (1982)), the polymeric liquid crystals which have been described up till now have response times which are too long for practical purposes.

Ferroelectric, quick-response polymeric liquid crystals should therefore be particularly suitable for the production of flexible displays.

It would be particularly advantageous to produce a display film by a continuous process in which quick-response polymeric ferroelectric liquid crystals are incorporated. The present invention accordingly provides novel, polymeric, ferroelectric liquid crystals.

SUMMARY OF THE INVENTION

The novel compounds are polymers which are composed of repeating units of the formula (I):

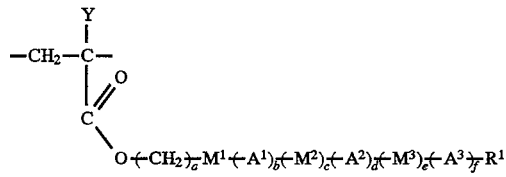

in which
Y=H, CH$_3$ or F,
R$^1$=a radical having at least two chiral centers according to one of the general formulae

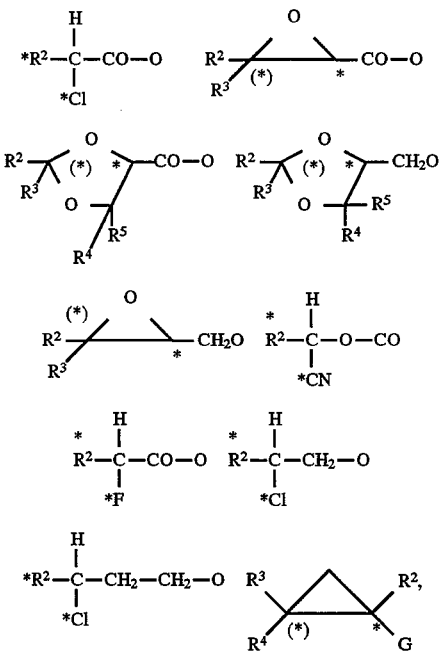

R$^2$, R$^3$, R$^4$ and R$^5$=H or a straight-chain or branched, chiral or achiral alkyl having 1 to 16, or alkenyl having 2 to 16, carbon atoms and in which one —CH$_2$— group can be replaced by —O—, —CO—O— or —O—CO—, or R$^2$ and R$^3$, or R$^3$ and R$^4$, together form a cyclic alkyl having 3 to 8 carbon atoms,

* R$^2$=chiral R$^2$, (*)=chiral carbon if R$^2$, R$^3$ and/or R$^4$ are achiral, a=2 to 20, preferably 6 to 12, b,c,d,e and f=0 or 1 with the proviso that d+e+f=2 or 3, A$^1$, A$^2$ and A$^3$=identical or different 1,4-phenylene in which 1 or 2 hydrogen atoms can be replaced by F, Cl and/or CN, trans-1,4-cyclohexylene in which 1 or 2 hydrogen atoms can be replaced by F, Cl, CN and/or CH₃, 2,5-pyrazinediyl, 3,6-pyridazinediyl, 2,5-pyridinediyl, 2,5-pyrimidinediyl, (1,3,4)-thiadiazole-2,5-diyl, 1,3-dioxan-2,5-diyl or 1,3-dithian-2,5-diyl, M² and M³=identical or different CO—O, O—CO, CO—S, S—CO, CH₂—O, O—CH₂ or CH₂—CH₂,

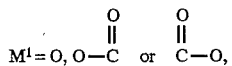

G=straight-chain or branched alkylene having 1 to 16 carbon atoms, or alkenylene having 2 to 16 carbon atoms, and in which one or two non-adjacent —CH₂— groups can be replaced by —O—, —S—, —O—CO—, —CO—O—, —S—CO— or —CO—S—.

The ferroelectric, liquid-crystalline polymer is preferably composed of repeating units of the formula (I) in which R¹, M¹ and a have the meanings given above, Y=H or CH₃ and the group (—A¹)$_b$(—M²)$_c$(—A²)$_d$(—M³)$_e$(—A³)$_f$— denotes:

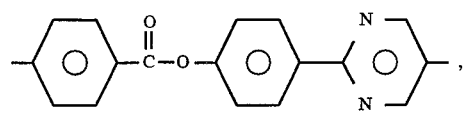

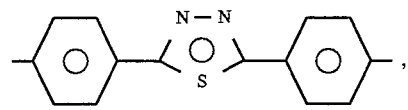

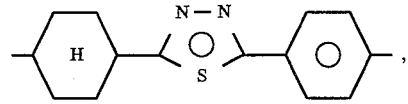

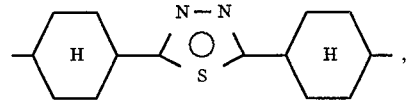

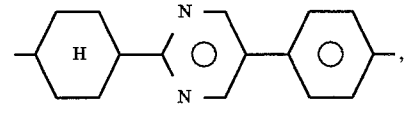

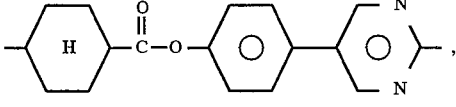

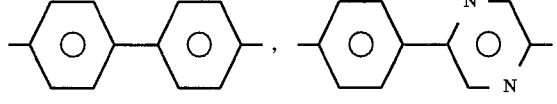

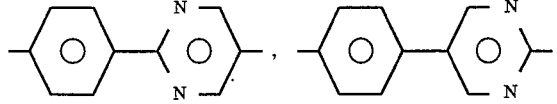

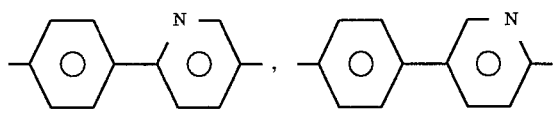

-continued

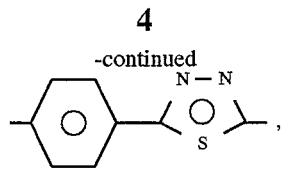

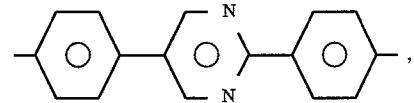

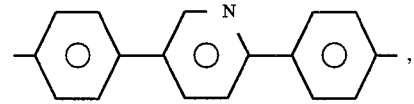

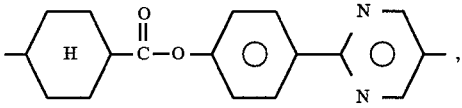

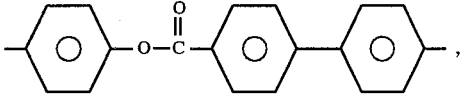

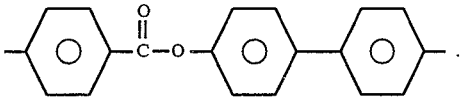

DESCRIPTION OF THE PREFERRED EMBODIMENTS

The ferroelectric, liquid-crystalline polymer is particularly preferably composed of repeating units of the formula (I) in which Y=H or CH₃, a=6 to 12 and the group —M¹

(—A¹)$_b$(—M²)$_c$(—A²)$_d$(—M³)$_e$(—A³)$_f$— denotes:

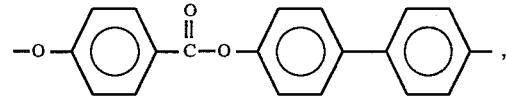

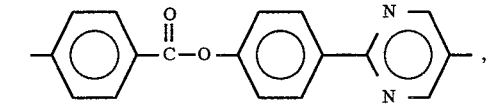

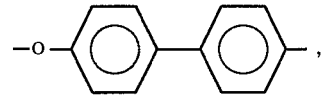

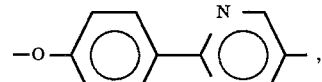

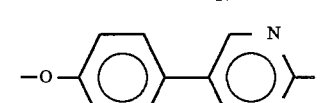

and R¹ is a radical according to one of the following formulae having two chiral centers:

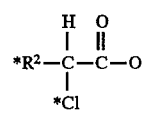

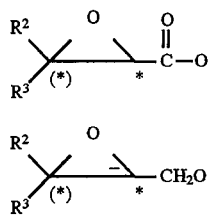

in which $R^2$ and $R^3$=H, a straight-chain or branched, chiral or achiral alkyl having 1 to 16 carbon atoms or $R^2$ and $R^3$ together form a cyclic alkyl having 3 to 8 carbon atoms.

The said polymers are prepared by free-radical polymerization of monomers of the formula (II)

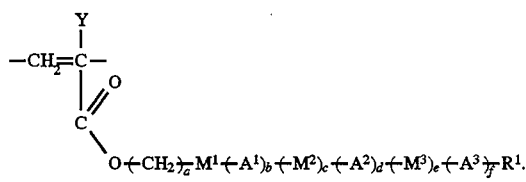

The monomers can be prepared by known processes.

EXAMPLE 1

Preparation of the monomer (III)

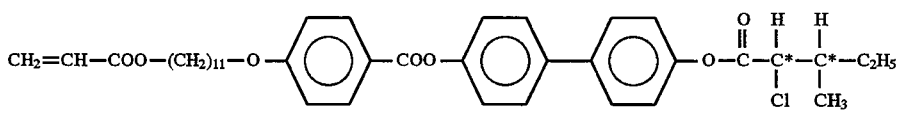

[4'-(2S,3R)-2-Chloro-3-methyl-pentanoyloxy)diphenyl-4-yl]4(11-acryloyloxy-undecanyloxy)benzoate a) A solution of 0.1 mol of the compound of the formula Br—$(CH_2)_{11}$—Br, 0.1 mol of methyl 4-hydroxybenzoate, 0.1 mol of $Na_2CO_3$ and 1 mol % of NaI is dissolved in 150 ml of acetone and heated for 24 h under reflux. After cooling, 150 ml of $CH_2Cl_2$ are added to the reaction mixture and the mixture is extracted twice using 50 ml quantities of 0.1N NaOH. After drying and evaporating off the solvent, the compound of the formula (IIIa) is obtained

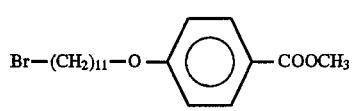

Yield: 85% b) 0.08 mol of the compound (IIIa) are dissolved in 150 ml of hot ethanol and 0.4 ml of NaOH is added. The reaction mixture is heated for 15 minutes under reflux and after cooling is acidified using conc. hydrochloric acid. After filtering, the compound of the formula (IIIb) is obtained.

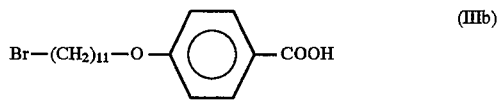

Yield: 80% c) 30 mmol of 4,4'-dihydroxybiphenyl are dissolved in 120 ml of $CH_2Cl_2$ and 42 mmol of diethylamine. To this solution are added dropwise at room temperature 42 mmol of trimethylchlorosilane and the mixture is stirred for 1 h. Then 20 mmol of the compound (IIIb) dissolved in 50 ml of $CH_2cl_2$ are added followed by a solution of 20 mmol of di-cyclohexylcarbodiimide and 3 mmol of dimethylaminopyridine in $CH_2Cl_2$. The mixture is stirred for 26 h at room temperature. The precipitate is filtered off under suction and recrystallized from ethanol which has been weakly acidified using hydrochloric acid. Yield 40% of the compound of the formula (IIIc)

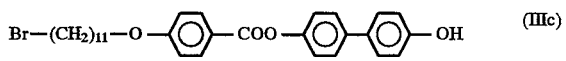

d) 6 mmol of the compound (IIIc), 6 mmol of the compound of the formula

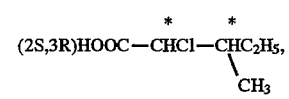

6 mmol of di-cyclohexylcarbodiimide and 1 mmol of dimethylaminopyridine are dissolved in 100 ml of dichloromethane and stirred for 36 h at room temperature. The precipitate is filtered off under suction and purified by recrystallization from ethanol. A compound of the formula (IIId) is obtained.

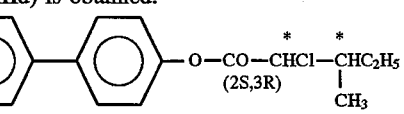

e) 5 mmol of the compound (IIId) and 10 mmol of acrylic acid are dissolved together with 10 mmol of diethylamine and 0.2 g of hydroquinone in 60 ml of dimethylformamide and stirred under an atmosphere of $N_2$ for 24 h at 115° C. After cooling, 60 ml of methanol are added and the mixture is cooled for 12 h in a refrigerator. The resulting precipitate is filtered off and purified by chromatography on silica gel using a mixture of dichloromethane/petroleum ether in the ratio of 1:4. A compound of the formula (III) is obtained.

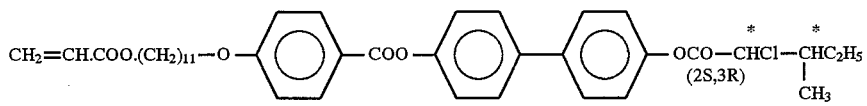

Polymerization of the monomers (III)

The monomer (III) is dissolved in anhydrous THF and polymerized with the addition of AIBN. After 24 h at 60° C., methanol is added. The precipitated polymer is filtered off under suction and reprecipitated several times or purified by chromatography.

EXAMPLE 2

Preparation of the monomer 1c

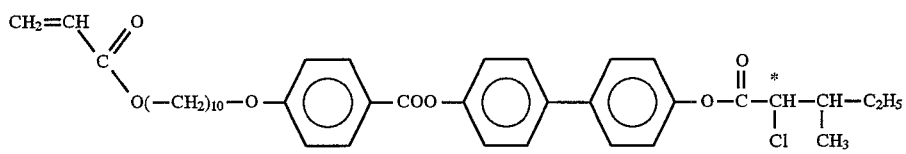

a) 2-(10-Hydroxy-decyloxy)benzoic acid (1a):

A mixture of 10-bromodecanol (0.15 mol), 4-hydroxy-benzoic acid (0.15 mol), KOH (0.33 mol), KI (5 g) and 500 ml of water is heated under reflux for 70 h. After cooling to room temperature, the reaction mixture is acidified (using concentrated hydrochloric acid). The white precipitate is filtered off and recrystallized twice from acetone.

Yield: 72.8 g (63%); melting point: 114° C.;
$^1$H-NMR (400 MH7, CDCl$_3$): δ=1.27–1.73 (m; 14H), 1.80 (tt, J=7 and 7 Hz; 2H), 3.64 (t, J=7HZ, 2H), 4.02 (t, J=7 Hz; 2H); 6.92, 802 (AA'BB', J(AB)=8.5 Hz; 4H)

b) (4-Hydroxy-4-diphenyl) 4-(10-acryloyloxy-decyloxy)-benzoate (1b):

Trimethylsilyl chloride (25 mmol) is added dropwise at 0° C. under an atmosphere of nitrogen to a solution of 4,4'-dihydroxyodiphenyl (18 mmol) and triethylamine (60 mmol) in 100 ml of dry methylene chloride. After stirring for one hour at 0° C., 12 mmol of the compound 1a dissolved in 100 ml of methylene chloride are added and then 300 mg of DMAP and also 15 mmol of DCCI. The mixture is stirred for 36 h at room temperature. Then acryloyl chloride (15 mmol) is added dropwise and the reaction mixture is stirred for a further hour. The white precipitate is filtered off and the crude product is recrystallized from HCl methanol.

Yield: 1.8 g (29%); melting point: 161°–163° C.
$^1$H-NMR (400 MHz, CDCl$_3$): δ=1.36–1.64 (m; 12H), 1.68 (m; 2H), 1.82 (tt, J=7 and 7 Hz; 2H), 4.05 (t, J=6 Hz; 2H), 4.16 (t, J=6 Hz; 2H), 5.82 (dd, J=10 and 1.5 Hz; 1H), 6.12 (dd, J=17 and 10 Hz; 1H), 6.14 (dd, J=17 and 10 Hz; 1H), 6.94, 7.56 (AA'BB', J(AB)=8.5 Hz; 4H), 6.97, 8.15 (AA'BB', J(AB)=8.5 Hz; 4H), 7.23, 7.45 (AA'BB', J(AB)=8.5 Hz, 4H), c) 4-(2S, 3S, -2-Chloro-3-methylpentanoyloxy)-4-diphenyl 4-(10-acryloyloxy-decyloxy)benzoate (1c)

A solution of 1b (3.3 mmol), (2S, 3S)-2-chloro-3-methylpentanoic acid (3.7 mmol), DCC (3.7 mmol) and DMAP (50 mg) in 20 ml of dry methylene chloride is stirred for 24 h at room temperature. The precipitate produced is then filtered off and purified by column chromatography (silica gel).

Yield: 1.16 g (54%);
$^1$H-NMR (400 MHz, CDCl$_3$): δ=1.00 (t, J=7 Hz; 3H), 1.16 (d, J=7 Hz;3H), 1.29–1.52 (m; 12H), 1.63–1.87 (m; 6H), 2.24 (m; 1H), 4.05 (t, J=7 Hz; 2H), 4.15 (t, J=7 Hz; 2H), 4.40 (d, J=7 Hz; 1H), 5.82 (dd, J=10 and 1.5 Hz; 1H), 6.12 (dd, J=17 and 10 Hz; 1H), 6.40 (dd, J=17 and 1.5 Hz; 1H) , 6.98, 8.16 (AA'BB', J(AB)=8.5 Hz; 4H), 7.20, 7.60 (AA'BB', J(AB)=8.5 Hz, 4H), 7.28, 7.60 (AA'BB', J(AB)=8.5 Hz, 4H).

Polymerization:

The monomer 1c is polymerized in anhydrous tetrahydrofuran under an atmosphere of nitrogen using AIBN. After 24 h at 60° C., the polymer is purified by reprecipitation from methanol. By chromatographic purification, it is possible to achieve a low molecular dispersity. A polymer having a molecular weight of Mw=35,000 is obtained (yield 48%).

The spontaneous polarization of the polymer at 75° C. to 100° C. is 100 to 1600 nC/cm$^2$; the response time at 14 V/µm is 35 to 1 msec.

EXAMPLE 3

Preparation of the monomer (2 g)

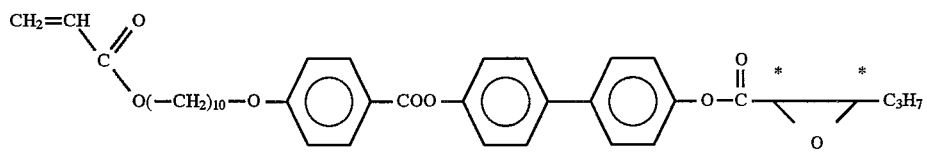

(cis-oxirane)

a) 4-(Tetrahydropyran-2-yloxy)benzoic acid

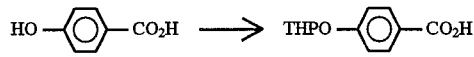

6 drops of conc. HCl are added to a mixture of 13.8 g (0.1 mol) of 4-hydroxybenzoic acid and 16.8 g (0.2 mol) of 3,4-dihydropyran and stirring is carried out for 24 h at 20°

C. To the solidified mixture are added 50 ml of ether and then 100 ml of petroleum ether, and then the mixture is filtered under suction and the filter residue dried.

Yield 18.4 g (83%)

b) 4,4'-Hydroxybiphenyl 4-(tetrahydropyran-2-yloxy)-benzoate

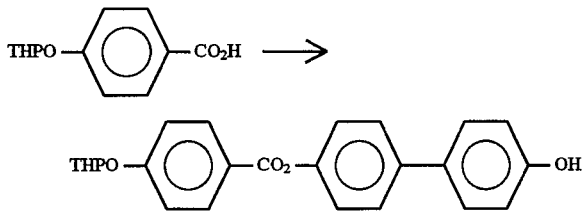

17 ml (126 mmol) of TMSCl are added dropwise over a period of 0.5 h at 0° C. to a solution of 16.7 g (90 mmol) of 4,4'-dihydroxybiphenyl and 18 ml (130 mmol) of triethylamine in 70 ml of THF and 300 ml of methylene chloride. After stirring for 30 min at 20° C., 13.3 g (60 mmol) of 2a, 13.4 g (65 mmol) of DCCF and 1.1 g (9 mmol of DMAP dissolved in methylene chloride are added. The mixture is stirred for 18 h at room temperature and is then filtered under suction and the filtrate concentrated to dryness. The residue is purified by recrystallization from acetone.

Yield: 9.6 g (24.6 mmol) 41% c) 2R,3S-Epoxyhexanoic acid

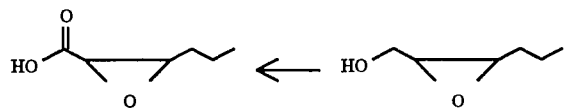

14.2 g (66 mmol) of NaIO$_4$ in 70 ml of H$_2$O and 286 mg (1.1 mmol) of RuCl$_3$ are added to a solution of 2.55 g (22 mmol) of 2R,3S-epoxyhexanol in 42 ml of CCl$_4$ and 35 ml of CH$_3$CN. The mixture is vigorously stirred for 3 h at RT. The mixture is then filtered under suction, the filtrate is extracted with 3×50 ml of CH$_2$Cl$_2$, and the combined organic phases are washed once with NaCl solution, dried (NaSO$_4$) and concentrated.

Yield: 2.56 g (20 mmol) 90% d) 4-4-(Tetrahydropyran-2-yloxy)benzoyloxy-4'-biphenyl 2R,3S-(2,3-epoxyhexanoate) (2d)

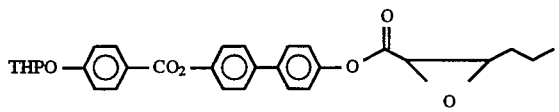

A mixture of 1.95 g (8 mmol) of 2b, 0.65 g (5 mmol) of 2c, 1.3 g (6 mmol) of DCCI and a spatula tipful of DMAP in 50 ml of CH$_2$Cl$_2$ (abs.) is stirred for 18 h at 20° C. The mixture is filtered under suction, the filtrate is concentrated and the product is purified by chromatography (using CH$_2$Cl$_2$/petroleum ether, 1:1 as the eluent).

Yield: 1.46 g (2.9 mmol) 58% e) 4 4-Hydroxybenzoyloxy-4'-biphenyl 2R,3S-(2,3-epoxyhexanoate) (2e)

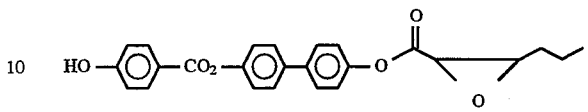

A mixture of 1.4 g (2.9 mmol) of 2d, 0.075 g (3 mmol) of PPTS and 50 ml of MeOH is stirred for 3 h at 50° C. All except about 10 ml of solvent are evaporated off and the product which has precipitated at 0° C. is filtered off under suction.

Yield: 980 mg (81%)

f) 10-Hydroxydecyl acrylate (2f)

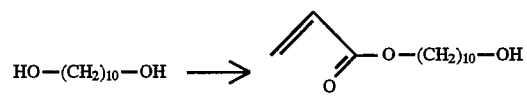

To a solution of 8.7 g (50 mmol) of 1,10-decanediol and 6.9 ml (50 mmol) of TEA in 100 ml of absolute THF are added dropwise 4.5 g (50 mmol) of acryloyl chloride and the mixture is stirred for 20 min at RT. The product is hydrolyzed [sic] using 50 ml of saturated NH$_4$Cl solution and extracted 3 times with ethanol.

The combined organic phases are washed once with saturated Na$_2$CO$_3$ solution and once with saturated NaCl solution, dried over MgSO$_4$ and concentrated.

The product is purified by chromatography.

Yield: 4.0 g (17.5 mmol) 35% g) 4 4 (10-Acryloyloxydecyloxy)benzoyloxy-4'-biphenyl 2R,3S-(2,3-epoxyhexanoate) (cis)

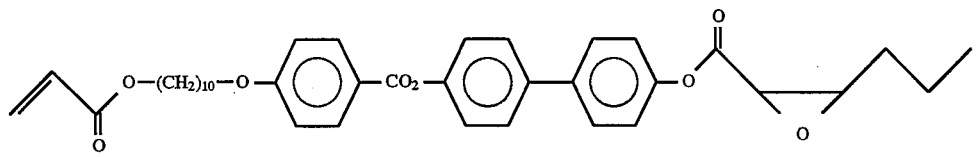

900 mg (2.15 mmol) of 2e and 570 mg (2.5 mmol) of 2f are reacted with 435 mg (2.15 mmol) of DEAD and 563 mg (2.15 mmol) of TPP.

Yields: 370 mg (0.59 mmol) 27%

Polymerization of the Monomer 2 g 300 mg (0.48 mmol) of the monomer are polymerized in THF using 3 mg (0.018 mmol) of AIBN. The product is purified by chromatography.

Yield: 121 mg (40%)

The polymer P has an average molecular weight $M_W$=9,200 and a molecular dispersity $E=M_W/M_N$=1.58. The liquid-crystalline polymer can be used not only in the ferro-electric but also in the electroclinic mode. Surprisingly, however, the response time is little dependent on temperature, as shown by the following table:

| T [°C.] | 96 | 110 | 128 | 160 |
|---|---|---|---|---|
| τ [ms] | 0.9 | 1.5 | 1.9 | 2.2 |

We claim:

1. A liquid-crystalline polymer composed of repeating units of the formula (I)

$$-CH_2-\underset{\underset{\underset{O-(CH_2)_a-M^1-(A^1)_b-(M^2)_c-(A^2)_d-(M^3)_e-(A^3)_f-R^1}{|}}{\overset{\|}{C}}}{\overset{Y}{\underset{|}{C}}}\overset{O}{\diagup}$$ (I)

in which

Y is H or CH$_3$,

R$^1$ is a radical of formulae $$R^2\underset{R^3}{\diagup}\overset{O}{\underset{(*)}{\triangle}}\underset{*}{-}CO-O \quad \text{or} \quad R^2\underset{R^3}{\diagup}\overset{O}{\underset{(*)}{\triangle}}\underset{*}{-}CH_2O$$

having at least two chiral centers,

R$^2$ and R$^3$ are H or a straight-chain or branched, chiral or achiral alkyl having 1 to 16 carbon atoms,

* and (*) each indicates a chiral carbon, a is 2 to 20, b,c,d,e and f are 0 or 1 with the proviso that d+e+f=2 or 3, A$^1$, A$^2$ and A$^3$ are 1,4-phenylene, M$^2$ and M$^3$ are identical or different CO—O or O—CO, and M$^1$ is O.

2. The liquid-crystalline polymer as claimed in claim 1, wherein a is 6 to 12.

3. The ferroelectric, liquid-crystalline polymer composed of repeating units of the formula (I) as claimed in claim 1, wherein Y is H or CH$_3$ and the group (—A$^1$)$_b$(—M$^2$)$^c$(—A$^2$)$_d$(—M$^3$)$_e$(—A$^3$)$_f$— is <chemical structure: phenylene-O-C(=O)-phenylene-phenylene> or

<chemical structure: phenylene-C(=O)-O-phenylene-phenylene>

4. The ferroelectric, liquid-crystalline polymer composed of repeating units of the formula (I) as claimed in claim 1, wherein Y is H or CH$_3$, a is 6 to 12, and the group —M$^1$(—A$^1$)$_b$(—M$^2$)$_c$(—A$^2$)$_d$(—M$^3$)$_e$(—A$^3$)$_f$— is <chemical structure: —O-phenylene-C(=O)-O-phenylene-phenylene->

5. A process for the preparation of a polymer as claimed in claim 1, which comprises polymerizing compounds of the formula (II)

$$CH_2=C\underset{\underset{COO-(CH_2)_a-M^1-(A^1)_b-(M^2)_c-(A^2)_d-(M^3)_e-(A^3)_f-R^1}{\diagdown}}{\overset{Y}{\diagup}}$$

in which

Y is H or CH$_3$,

R$^1$ is a radical of formulae $$R^2\underset{R^3}{\diagup}\overset{O}{\underset{(*)}{\triangle}}\underset{*}{-}CO-O \quad \text{or} \quad R^2\underset{R^3}{\diagup}\overset{O}{\underset{(*)}{\triangle}}\underset{*}{-}CH_2O$$

having at least two chiral centers,

R$^2$ and R$^3$ are H or a straight-chain or branched, chiral or achiral alkyl having 1 to 16 carbon atoms,

* and (*) each indicates a chiral carbon, a is 2 to 20, b,c,d,e and f are 0 or 1 with the proviso that d+e+f=2 or 3, A$^1$, A$^2$ and A$^3$ are 1,4-phenylene, M$^2$ and M$^3$ are identical or different CO—O or O—CO, and M$^1$ is 0, using a free-radical former.

6. An electrooptical component containing a polymer as claimed in claim 1.

* * * * *